P. F. MOREY.
STENCH-TRAP.
No. 189,570. Patented April 17, 1877.
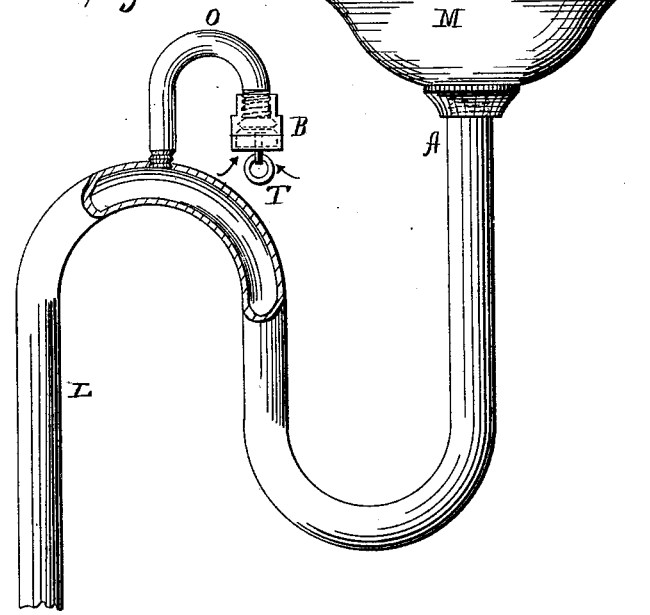
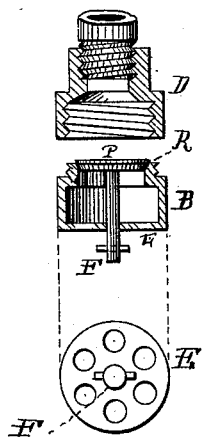

UNITED STATES PATENT OFFICE.

PARKER F. MOREY, OF OAKLAND, CALIFORNIA, ASSIGNOR OF ONE-HALF HIS RIGHT TO JAMES WILSON MUSSER, OF SAME PLACE.

IMPROVEMENT IN STENCH-TRAPS.

Specification forming part of Letters Patent No. 189,570, dated April 17, 1877; application filed March 1, 1877.

*To all whom it may concern:*

Be it known that I, PARKER FARNSWORTH MOREY, of Oakland, in the county of Alameda, and in the State of California, have invented certain new and useful Improvements in Stench-Traps; and do hereby declare that the following is a full, clear, and exact description thereof, reference being had to the accompanying drawings, and to the letters of reference marked thereon, making a part of this specification.

In commonly-used stench-traps a great inconvenience has existed on account of their liability to "siphon" out.

The column of water passing down the pipe leading from the trap toward the sewer, together with the atmospheric pressure upon the water in the trap, often operated to draw the water out of the trap, so that, when the water ceased running, the pipe and empty trap constituted an open viaduct, by which the foul air and vapors from the sewers and elsewhere were conducted back into the rooms which the trap was intended to protect.

Many devices have been applied in efforts to overcome this defect in sewer or stench traps.

My invention furnishes a remedy for the difficulty above described; and it consists in the construction of parts, as hereinafter described.

The following is a correct description of my invention, reference being had to the drawings forming a part of the specification.

In said drawings similar letters of reference refer to corresponding parts.

In Figure 1, A, T, and L is a pipe, bent to form an ordinary stench-trap, with a portion cut away to show the inside of the pipe. M is a wash-basin, or other receptacle, from whence waste water is let into the sewer through the trap and pipe A T L. A T is the portion of the pipe which constitutes the trap. L is the long part of the pipe leading toward the sewer. O is a small pipe, having at its extremity B an air-valve attached.

In Fig. 2, D and B represent sectional views, in elevation, of the air-valve B and the separated parts of an ordinary screw-connection, by which the valve is connected with the pipe O in Fig. 1. E shows a bottom or end view of the part at B.

The air-valve, as shown at B, is a thin horizontal disk, P, having a vertical stem, F, passing downward, to assist in retaining it in its position. Said disk rests upon a seat, R. A ring or pin is inserted through the lower end of the stem F to prevent it and the disk P from being drawn too far upward.

The operation is as follows: Water passes from M through the pipe until M is empty, and the water descends in the pipe A until it is level with the water in the bend at the lower end of the pipe O. The pressure of the water from above then ceases, and the weight of the column of water in the arm L draws downward, and tends to create a vacuum at the point underneath the pipe O. In ordinary cases the vacuum is prevented by the water being forced into it from the trap A T, thus leaving the trap empty, and, consequently, useless; but in the application of my invention the said vacuum is prevented by air being drawn through the air-valve and pipe O, and thus the water is prevented from being drawn out of the trap A T, and its efficiency is preserved.

Having thus described my invention, what I claim, and desire to secure by Letters Patent, is—

The pipe O, provided with the detachable part B, having perforated bottom E and air-valve P F, in combination with the bent pipe and bowl of a stench-trap, substantially as and for the purposes herein set forth.

In testimony that I claim the foregoing I have hereunto set my hand this 20th day of February, 1877.

PARKER F. MOREY.

Witnesses:
M. A. WHEATON,
ED. J. SMITH.